June 26, 1951            H. L. MILLER            2,558,709
WEAR SHOE FOR RAILROAD EQUALIZER TRUCK FRAMES
Filed July 17, 1946
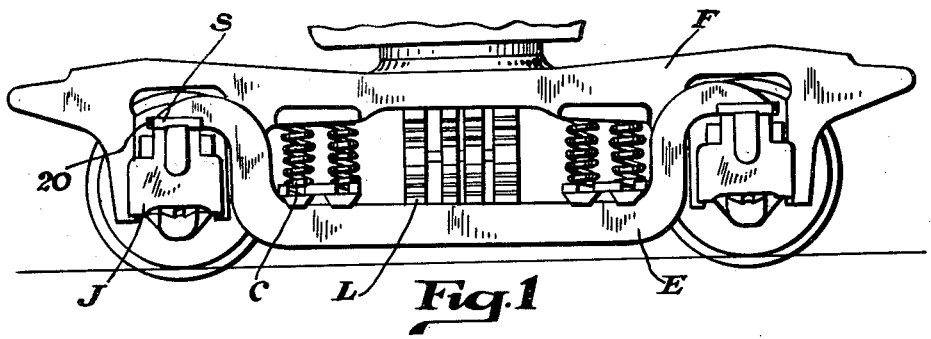
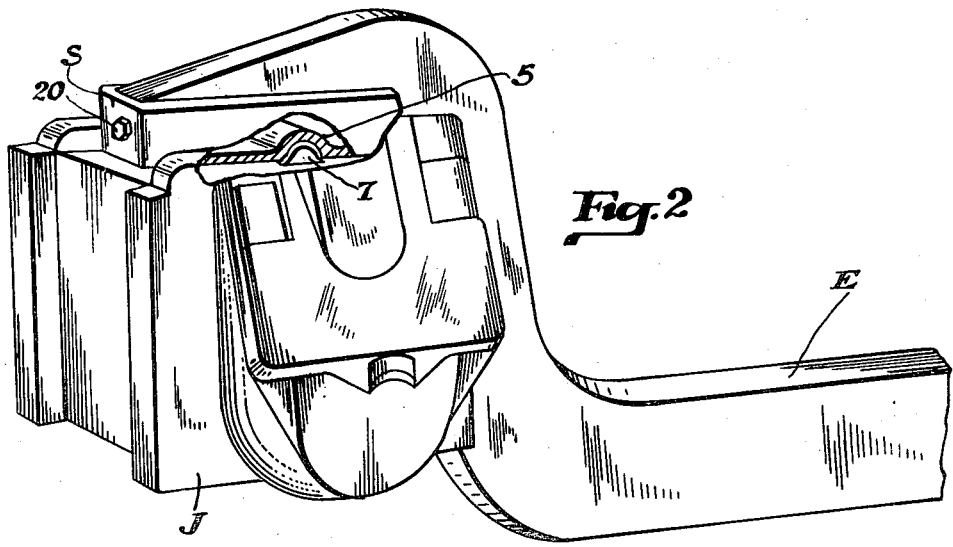
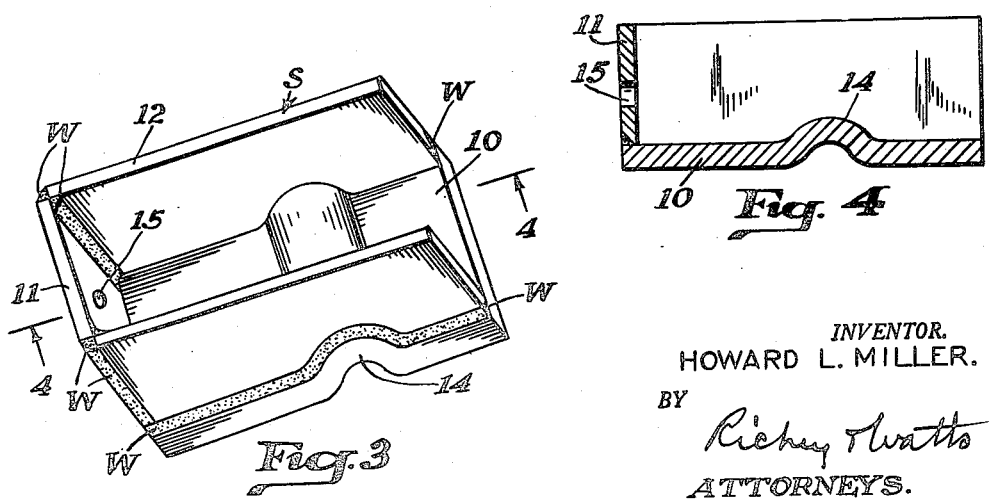
INVENTOR.
HOWARD L. MILLER.
BY
*Richey Watts*
ATTORNEYS.

Patented June 26, 1951

2,558,709

UNITED STATES PATENT OFFICE 2,558,709

WEAR SHOE FOR RAILROAD EQUALIZER TRUCK FRAMES

Howard L. Miller, Cleveland Heights, Ohio, assignor to Republic Steel Corporation, Cleveland, Ohio, a corporation of New Jersey Application July 17, 1946, Serial No. 684,167

2 Claims. (Cl. 105—194)

The present invention relates in general to vehicles and is particularly concerned with a novel railway car truck equalizer bar assembly and with novel means for preventing wear of equalizer bars.

Railway car truck equalizer bars are used in conjunction with railway passenger cars in great numbers, there usually being two such bars necessary for each car truck and four for each car. These bars are relatively long and heavy and expensive, and because of the relatively great weights which they carry and their motion with respect to the surfaces on which they bear in frictional engagement, they must be frequently examined for dangerous wear, and must often be replaced. Many serious efforts have been exerted to avoid the high replacement expense of these bars, but prior to this invention all these have been unsuccessful. One result of these efforts, by way of example, was the procedure of welding metal pieces to equalizer bars to replace the portions of the bars worn away in use. The failure of these welded additions to the equalizers to withstand for long the service imposed upon them has made them dangerous and uneconomical to use and may lead to regulations against the use of welded equalizer bars.

By virtue of my present invention the useful life of equalizer bars can be prolonged an almost unlimited extent and does not involve patching. Moreover, this invention enables this result in a manner so economical as to compel its general use.

This invention will be better understood by referring to the drawings accompanying and forming a part of this specification, in which Figure 1 is a side elevational view of a railway car truck assembly including elements embodying this invention;

Figure 2 is a perspective view of a railway car truck journal box and an equalizer bar assembly embodying this invention;

Figure 3 is a perspective view of the equalizer bar shoe shown in Fig. 2; and,

Figure 4 is a view taken on line 4—4 of Fig. 3.

Referring to Figs. 1 and 2, the equalizer bar assembly includes an equalizer bar E, a journal box J at each end thereof, and metal shoes S partially inclosing end portions of the equalizer bar disposed upon the journal boxes.

The equalizer bar bridges the space between the journal boxes and supports coil springs C and leaf springs L upon which the principal frame F of the truck is carried. The equalizer bar is a generally U-shaped metal member having substantially horizontally projecting, tapered end portions and having in the lower surface of each end portion a semi-cylindrical transversely extending recess 5. Each end portion of said bar is provided with a threaded aperture (not shown) to receive a securing bolt.

Journal box J is a metal box for inclosing the end of an axle of a car truck and housing the bearings of the truck, and is provided with an upper surface for engagement with the equalizer bar. This surface is provided with a transversely extending, semi-cylindrical rib 7 of substantially smaller radius than the recess 5.

Shoe S comprises a box-like metal element having a bottom wall 10, an end wall 11, and vertically extending side walls 12. The bottom wall 10 is provided with semi-cylindrical indentation 14 which defines a recess in the bottom surface of that wall having substantially the same radius as that of rib 7. The top or inner surface of the indented portion of the wall 10 has substantially the same radius as the recess 5. The end wall 11 is provided with an aperture 15 to receive a threaded bolt 20. The side walls of each shoe are secured to the bottom plate and end wall by means of welds W and are so spaced that in assembly with the equalizer bar they closely engage the vertical side and end portions of the bar ends.

In assembly the equalizer bar E and the shoes S are engaged, as shown in Figs. 1 and 2 with a shoe enclosing the lower portion of each end of the bar, and with the shoes and bar being held together by means of bolt 20. The equalizer bar rests at each end upon the bottom plates 10 of the shoes, and these plates rest upon the tops of the journal boxes.

The depicted combination is assembled by slipping the shoes S onto the ends of the bar, securing the shoes and bars together by inserting the bolts 20 through apertures 15 of the shoes and into the threaded apertures of the bar and drawing up said bolts, and then placing the bar in operating arrangement upon a railway passenger car truck so that the under surfaces of the shoes bear upon the top surfaces of the journal boxes and so that the indented portion of each shoe receives the rib 7 of the journal box in close fitting engagement to stabilize the bar and journal boxes against movement apart with respect to each other.

Having thus described the present invention so that others skilled in the art may understand and practice the same, I state that what I desire to secure by Letters Patent is defined in what is claimed.

What is claimed is:

1. A railway car truck equalizer bar assembly comprising an equalizer bar and metal shoes on each end thereof, said bar having solid end portions each provided with a transverse groove in its lower surface and a hole extending longitudinally inward from the end surface, each metal shoe including a bottom wall, an end wall having a hole therein, and spaced side walls, the inner surfaces of said walls engaging the opposed surfaces of the end portions of the bar, the bottom wall being bent to form a rib on its upper surface to seat in the said groove of the bar and a recess in its lower surface to receive a correspondingly shaped rib on a journal box, means extending through the holes in the end walls and into the holes in the bar to secure the shoes on the bar for movement therewith.

2. A railway car truck equalizer bar assembly comprising an equalizer bar and metal shoes on each end thereof, said bar having solid end portions each provided with a transverse groove in its lower surface, each metal shoe including a bottom wall, an end wall, and spaced side walls, the inner surfaces of said walls engaging the opposed surfaces of the end portions of the bar, the bottom wall being bent to form a rib on its upper surface to seat in the said groove of the bar and a recess in its lower surface to receive a correspondingly shaped rib on a journal box, and means engaging the end walls of the shoes and the end portions of the bar for securing the shoes to the bar for movement therewith.

HOWARD L. MILLER.

REFERENCES CITED

The following references are of record in the file of this patent:

UNITED STATES PATENTS

| Number | Name | Date |
|---|---|---|
| 792,943 | Stephenson | June 20, 1905 |
| 1,189,495 | Schoenberger | July 4, 1916 |
| 1,727,560 | Randel | Sept. 10, 1929 |
| 1,745,321 | Brittain | Jan. 28, 1930 |

FOREIGN PATENTS

| Number | Country | Date |
|---|---|---|
| 1,023 | Great Britain of 1891 | Nov. 14, 1891 |
| 700,920 | France | Jan. 5, 1931 |